United States Patent [19]

Ohno et al.

[11] Patent Number: 5,646,904
[45] Date of Patent: Jul. 8, 1997

[54] SEMICODUCTOR MEMORY WITH A TIMING CONTROLLED FOR RECEIVING DATA AT A SEMICONDUCTOR MEMORY MODULE TO BE ACCESSED

[75] Inventors: Yasuhiro Ohno; Manabu Miyata, both of Tokyo, Japan

[73] Assignee: Oki Electric Industry Co., Ltd., Tokyo, Japan

[21] Appl. No.: 544,540

[22] Filed: Oct. 18, 1995

[30] Foreign Application Priority Data

Oct. 25, 1994 [JP] Japan ................. 6-260449

[51] Int. Cl.$^6$ ................................. G11C 7/00
[52] U.S. Cl. ......................... 365/233; 365/194
[58] Field of Search ....................... 365/233, 194

[56] References Cited

U.S. PATENT DOCUMENTS 5,414,672  5/1995  Ozeki et al. .............. 365/233 X
5,422,781  6/1995  DiMarco ................... 365/233 X

FOREIGN PATENT DOCUMENTS 0 379 772   8/1990   European Pat. Off. .
0 479 428   4/1992   European Pat. Off. .
0 487 910   6/1992   European Pat. Off. .
0 549 139   6/1993   European Pat. Off. .
0 557 582A  9/1993   European Pat. Off. .
0 619 546  10/1994   European Pat. Off. .

*Primary Examiner*—Do Hyun Yoo
*Attorney, Agent, or Firm*—Rabin, Champagne, & Lynt, P.C.

[57] ABSTRACT

In a semiconductor memory, a plurality of semiconductor memory modules are connected through a common clock signal line and one or more other signal lines to an accessing circuit. The accessing circuit has a timing information storage unit for storing predetermined access timing information associated with the respective semiconductor memory modules, and a timing varying unit for varying a data receiving timing at a transfer destination in compliance with a semiconductor memory module to be accessed, on the basis of the access timing information stored in the timing information storage unit.

9 Claims, 11 Drawing Sheets

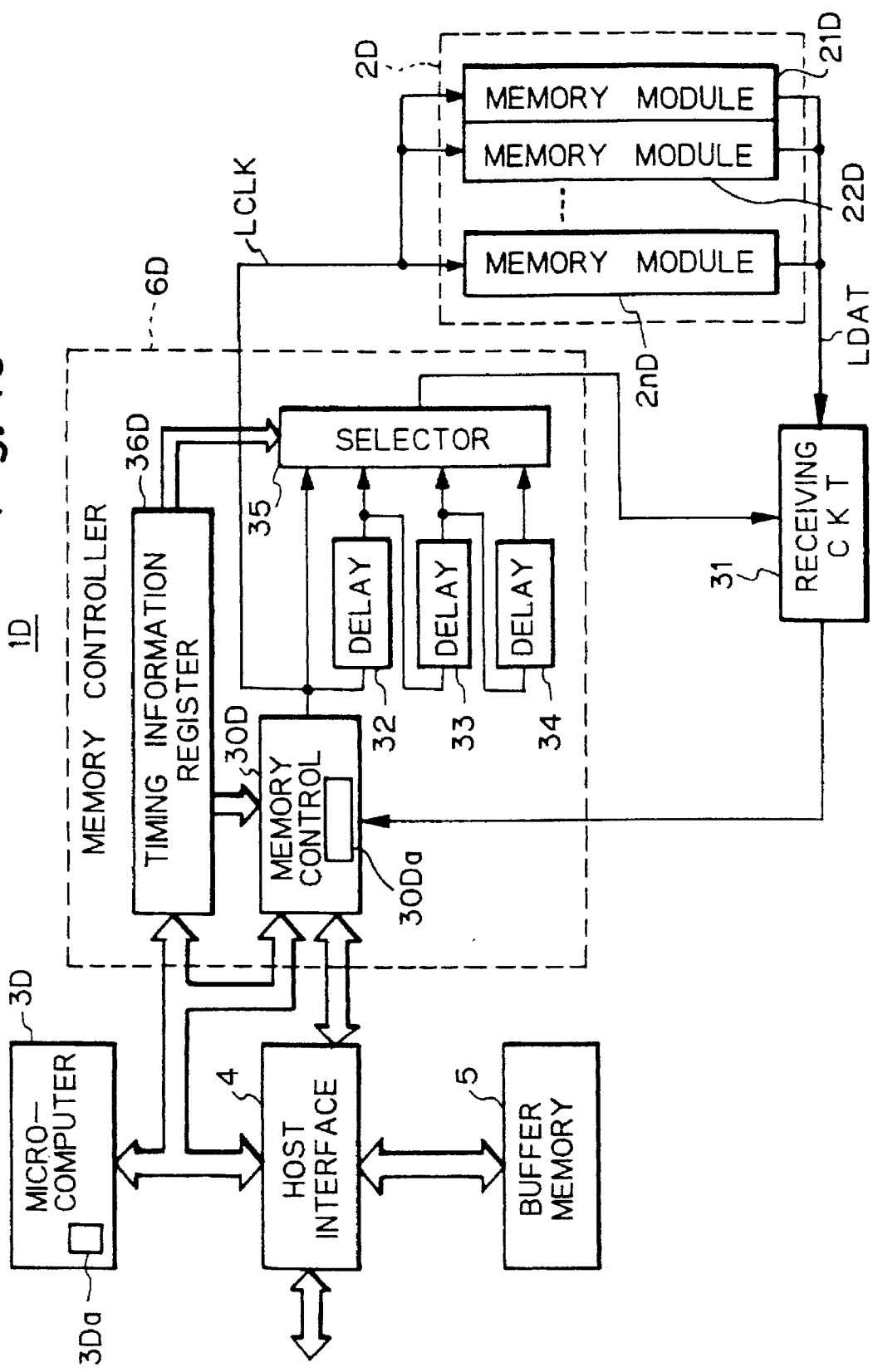

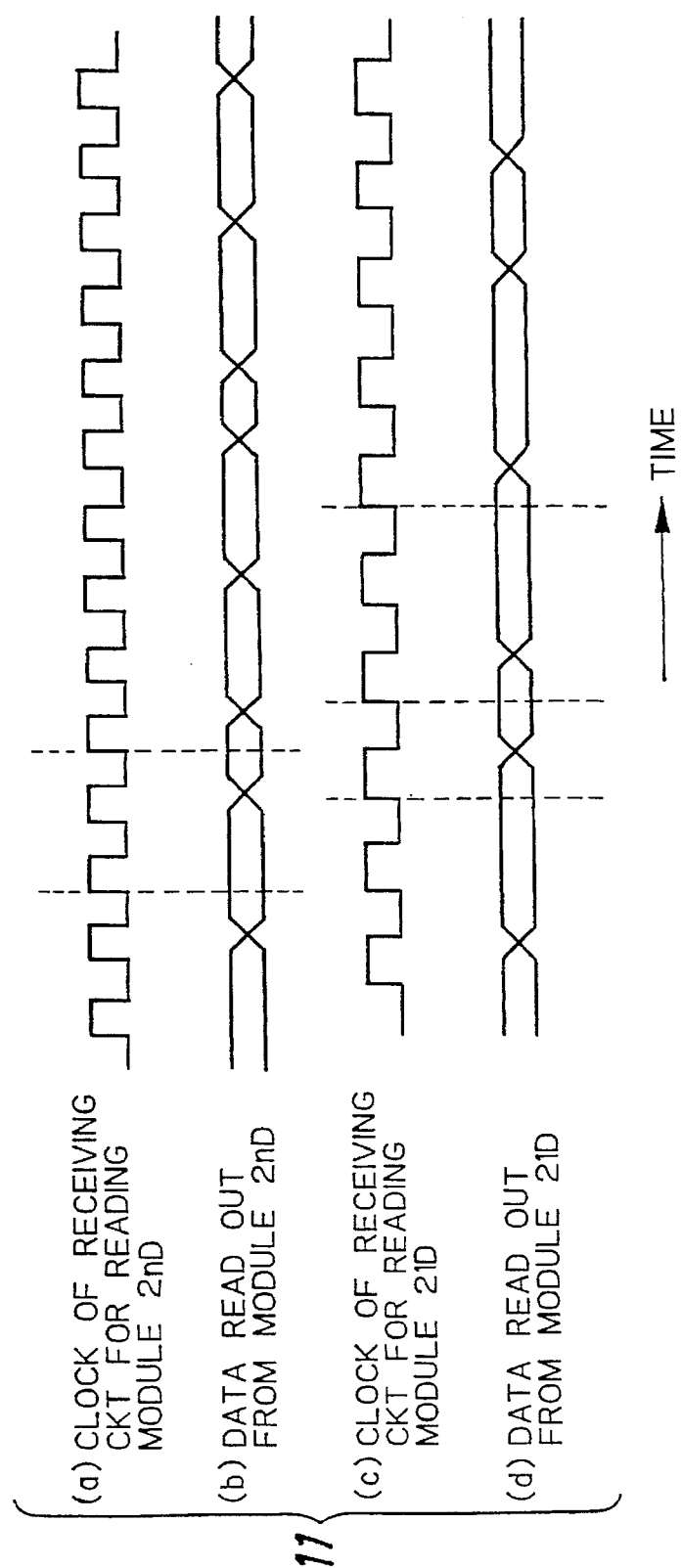

SEMICODUCTOR MEMORY WITH A TIMING CONTROLLED FOR RECEIVING DATA AT A SEMICONDUCTOR MEMORY MODULE TO BE ACCESSED

BACKGROUND OF THE INVENTION

1. Field of the Invention

The present invention relates to a semiconductor memory which is applicable to, for example, a semiconductor disk device fabricated with a plurality of semiconductor memories, which is used in a fashion similar to a hard disk device.

2. Description of the Background Art

For example, laptop of personal computers include a memory space which can be extended by connecting a card-like semiconductor disk device to an extended connector slot which is adapted for connecting thereto a hard disk drive.

FIG. 2 shows an example of a semiconductor disk device which is used as an auxiliary memory device as mentioned above. In FIG. 2, the semiconductor disk device 1 comprises one or more memory module groups 2, a microcomputer 3, a host interface 4, a buffer memory 5 and a memory controller 6. Each of the memory module groups 2 comprises a plurality of memory modules 21–2n, each of which is constituted of a single chip of serial memory, such as flash memory, and has the same speed capability as the others. The memory modules 21–2n in the memory module group 2 are connected in common with a bidirectional data line LDAT and a clock signal line LCLK.

It is assumed that the memory module group 2 corresponds to a header in a hard disk device; each of the memory modules 21–2n to a cylinder in the hard disk device; and an internal storage area of each of the memory modules 21–2n to a predetermined number of sectors from one sector address to another, where n is an integer.

The memory modules 21–2n are provided for the semiconductor disk device 1, and upon receipt of serial data for control, including an address and a type of access, for example, they continuously write thereinto or read out thereof data corresponding to a sector, e.g. 536 bytes of data.

To effect a writing operation on the semiconductor disk device 1, there is a need to supply from a host computer, not shown, thereto a command including information such as a header number, a cylinder number, the first sector number, the number of writing sectors and the like, and an additional command for instructing a writing operation. After issuance of these commands, data are transferred after the lapse of a predetermined time corresponding to the seek time, the rotation time and the like.

Upon receipt of the commands through the host interface 4, the microcomputer 3 decodes and converts the commands into control information accessible to a memory module 2i, the control information including an indication designating a memory module 2i and an address designating a sector in that memory module 2i, into which data is to be written, where i is an integer between 1 and n, inclusive. The control information thus converted is supplied to the memory controller 6. On the other hand, transmitted data for writing is fed through the host interface 4 to the buffer memory 5.

The memory controller 6 sends out serial data for control, which consists of an address, a control signal for instructing writing and the like, over the bidirectional data line LDAT to a predetermined memory module group 2 in accordance with the control information outputted from the microcomputer 3, and then sends out a sector of data from the buffer memory 5 through a parallel-to-serial conversion on the bidirectional data line LDAT to the predetermined memory module group 2. This transfer is repeated on a sector-by-sector basis. When the serial data for control is sent out to the bidirectional data line LDAT, and when data to be written is sent out to the bidirectional data line LDAT, the memory controller 6 sends out, of course, a clock signal to the clock signal line LCLK in synchronism with those sending operations, so that data supplied from the host computer is written into the predetermined memory module 2i of the memory module group 2.

On the other hand, to effect a reading operation on the semiconductor disk device 1, there is a need to supply from a host computer, not illustrated, to the semiconductor disk device 1 a command including information such as a header No., a cylinder No., a top sector No., the number of writing sectors and the like, and an additional command for instructing a reading operation.

Upon receipt of the commands through the host interface 4, the microcomputer 3 decodes and converts the commands into control information accessible to a memory module 2i, the control information including an indication designating a memory module 2i and an address designating a sector in that memory module 2i, from which data is to be read out. The control information thus converted is supplied to the memory controller 6.

The memory controller 6 sends out serial data for control, which consists of an address, a control signal for instructing writing and the like, over the bidirectional data line LDAT to a predetermined memory module group 2 in accordance with the control information outputted from the microcomputer 3, and sends out a clock signal on the clock signal line LCLK to the predetermined memory module group 2 in synchronism with the serial data sending operation. Also after sending the serial data for control, the memory controller 6 continuously sends out the clock signal on the clock signal line LCLK to the predetermined memory module group 2 and receives data read out from a predetermined memory module 2i of the memory module group 2 in response to the clock signal. The received data are converted into parallel data and stored in the buffer memory 5 through the host interface 4. In this manner, the data stored in the buffer memory 5 are transferred via the host interface 4 to the host computer.

However, the semiconductor disk device 1 has a drawback in that a timing relation between transfer data and the clock signal deviates from a predetermined timing relation at a transfer destination (a memory module when writing, or a memory controller when reading) for the reasons as set forth below:

(1) It is difficult to avoid such a situation that the timing of the clock signal with respect to the timing of outputting data is outside a specified range due to an irregularity caused by manufacturing the memory controller;

(2) There exists a difference in performance between the memory modules owing to an irregularity in manufacturing the memory modules;

(3) The lengths of the signal line and the bidirectional data line, which are connected to a memory module, vary depending upon the position in which the memory module is loaded, and parasitic capacitance and resistance vary depending upon a path. These cause a delay in transferring the signals and data to vary; and (4) The signal lines are mutually different in length, which are connected to associated memory modules even in the same memory module group depending upon the position in which the memory module is loaded, and parasitic capacitance and resistance vary depending upon a path. These also cause a delay in transferring the signals to vary; and (5) It is difficult to avoid skewing of the delay in transferring the signals and data.

Consequently, when the transfer is effected in a certain timing, some memory module will encounter critical set-up and hold timings. Thus, there is a large possibility of malfunctions in writing and reading.

If all the memory modules were involved in the same timing deviation, it would be possible to avoid the above-mentioned inconvenience through, for example, regulating the phase of the clock signal outputted from the memory controller. However, for example, as shown in parts (a) and (b) of FIG. 3, while there is obtained a good timing on the memory module 2n which is located nearest to the memory controller 6, the memory module 21, which is located farthest from the memory controller 6, will encounter severe set-up and hold timing discrepancies, as shown in parts (c) and (d) of FIG. 3. Therefore, in such a case, it is impossible to apply the above-mentioned measure.

There is a way to prevent malfunctions at the time of writing and reading by means of providing a large margin of the set-up time and the hold time through elongating a cycle time or clock period. However, according to this way, there will occur another problem such that the transfer rate at the time of transfer from and to the memory module is reduced, and as a result the operational speed of the semiconductor disk device must be reduced.

This problem occurs on not only with the semiconductor disk device, but also the various kinds of semiconductor memories in which a plurality of memory modules share the data line and the clock signal line jointly with each other.

SUMMARY OF THE INVENTION

It is therefore an object of the present invention to provide a semiconductor memory capable of operating at high speed such that sufficient set-up time and hold time are ensured even in the case where any of the memory modules, which share the data line and the clock signal line jointly with each other, is accessed.

In accordance with the present invention, in a semiconductor memory, a plurality of semiconductor memory modules are connected through a common clock signal line and one or more other signal lines to an access means, said access means comprising: a timing information storage unit for storing beforehand access timing information associated with the respective semiconductor memory modules; and a timing varying unit for varying a data receiving timing at a transfer destination in compliance with a semiconductor memory module to be accessed, on the basis of the access timing information stored in said timing information storage unit.

Further, in accordance with the present invention, in a semiconductor memory, a plurality of semiconductor memory modules are connected through a common clock signal line and one or more other signal lines to an access means, said semiconductor memory modules being different in operational speed, said access means comprising: a timing information storage unit for storing beforehand access timing information associated with the respective semiconductor memory modules; and a clock width varying unit for varying a clock width of a clock signal to be applied to a semiconductor memory module to be accessed, on the basis of the access timing information stored in said timing information storage unit.

Furthermore, in accordance with the present invention, in a semiconductor memory, a plurality of semiconductor memory modules are connected through a common clock signal line and one or more other signal lines to an access means, said semiconductor memory modules being different in operational speed, said access means comprising: a timing information storage unit for storing beforehand access timing information associated with the respective semiconductor memory modules; a timing varying unit for varying a data receiving timing at a transfer destination in compliance with a semiconductor memory module to be accessed, on the basis of the access timing information stored in said timing information storage unit; and a clock width varying unit for varying a clock width of a clock signal to be applied to the semiconductor memory module to be accessed, on the basis of the access timing information stored in said timing information storage unit.

According to the present invention, when a semiconductor memory module is accessed, access timing information associated with the semiconductor memory module, which is stored in the timing information storage unit, is derived and the timing varying unit varies a data receiving timing at a transfer destination in compliance with the semiconductor memory module to be accessed, on the basis of the access timing information. This feature makes it possible to always permit access for the semiconductor memory module in a suitable time period even if the semiconductor memory module to be accessed is altered, thereby establishing a favorable data transfer.

Further according to the present invention, semiconductor memory modules are utilized which are different in operational speed. This emphasizes freedom in selecting the semiconductor memory modules. In this case, when a semiconductor memory module is accessed, access timing information associated with the semiconductor memory module, which is stored in the timing information storage unit, is derived and the clock width varying unit varies the clock width of a clock signal to be applied to a semiconductor memory module to be accessed, on the basis of the access timing information. This feature makes it possible to always permit access for the semiconductor memory module in a suitable time period even if the semiconductor memory modules that are different in operational speed are invloved, thereby establishing a favorable data transfer.

BRIEF DESCRIPTION OF THE DRAWINGS

The objects and features of the present invention will become more apparent from consideration of the following detailed description taken in conjunction with the accompanying drawings in which:

FIG. 10 is a schematic block diagram of a semiconductor disk device according to a still further alternative embodiment of the present invention;

FIG. 11 is a time chart useful for understanding the semiconductor disk device shown in FIG. 10.

DESCRIPTION OF THE PREFERRED EMBODIMENTS (A) First embodiment

The first embodiment, in which the present invention is applied to a semiconductor disk device, will be described in conjunction with the accompanying drawings. It is noted that the first and second embodiments are involved in the case where all the memory modules in a semiconductor disk device are of the same operational speed. In this respect, these embodiments are different from the third and fourth embodiments, which will be described later.

Figure 1:
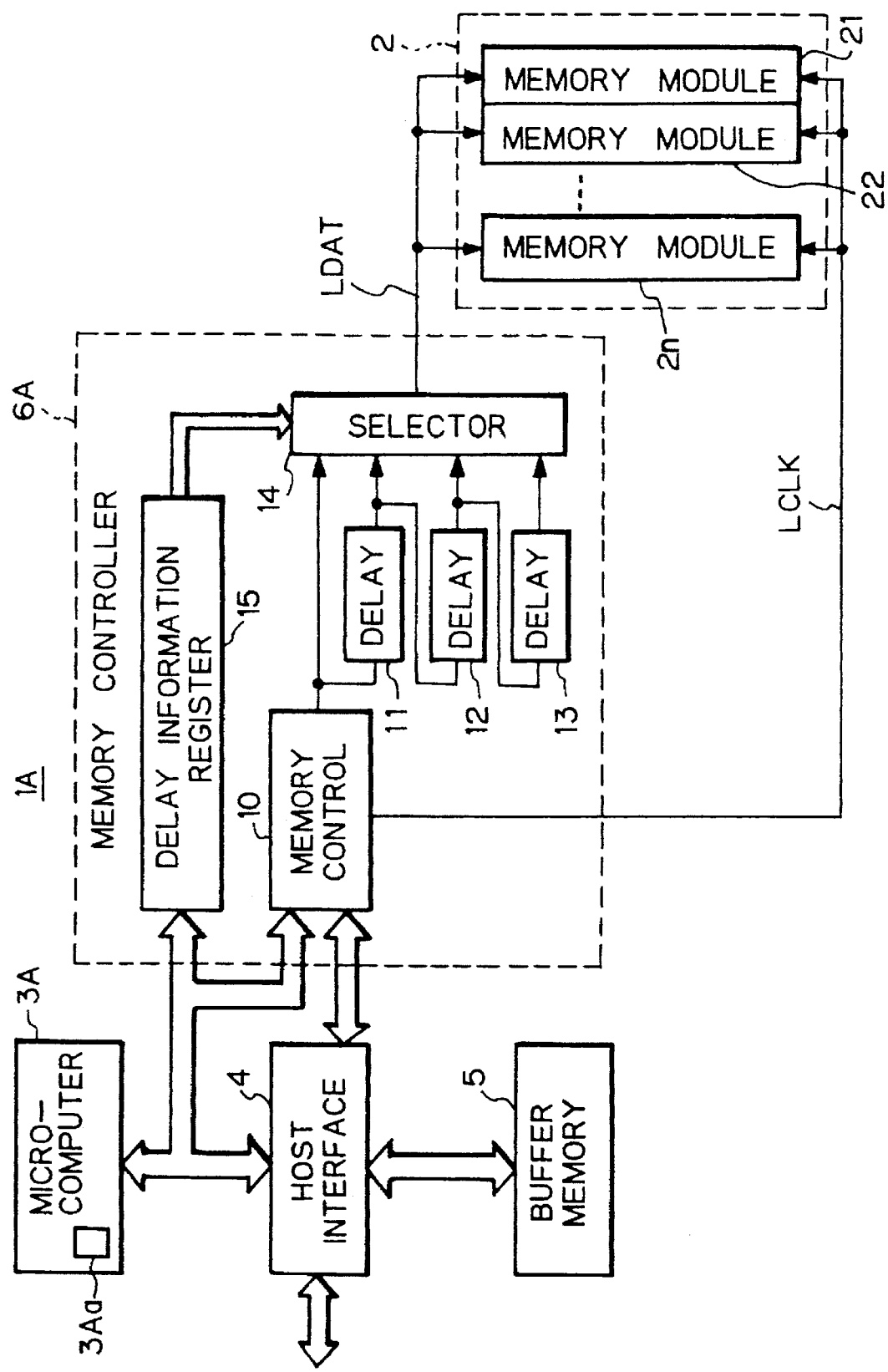
FIG. 1 is a schematic block diagram of a semiconductor disk device according to an embodiment of the present invention.

An aspect of the semiconductor disk device according to the first embodiment resides in writing data into the memory modules. In order to simplify the understanding of the aspect, FIG. 1 shows the use of a single memory module group. In FIG. 1, like components are denoted by the same reference numerals or marks as those of FIG. 2.

In FIG. 1, the semiconductor disk device 1A according to the first embodiment comprises a memory module group 2, a microcomputer 3A, a host interface 4, a buffer memory 5 and a memory controller 6A. However, the microcomputer 3A and the memory controller 6A are different from those of the semiconductor disk device 1 shown in FIG. 2.

The microcomputer 3A stores delay information 3Aa for each of the memory modules 21 . . . , 2n in the case where data are transferred to the memory modules 21 . . . , 2n. For example, the delay information 3Aa is stored in the form of a microprogram. When the microcomputer 3A recognizes the memory module 2i into which data is to be written, the microcomputer 3A feeds the delay information 3Aa and the associated writing signal to the memory controller 6A, prior to starting of data transfer to the memory module group 2, by a memory control circuit 10 which will be described later.

Figure 2:
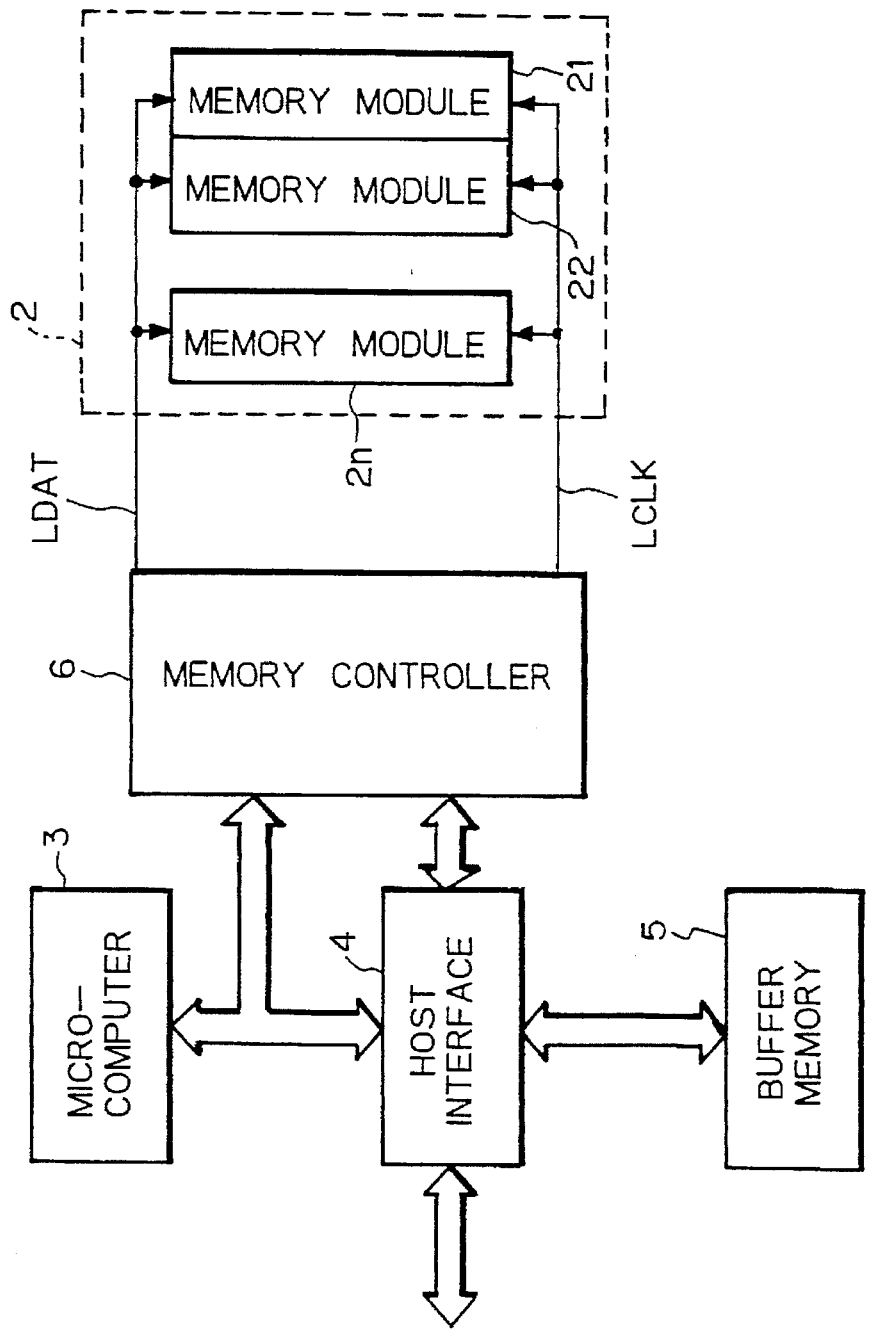
FIG. 2 is a schematic block diagram of a conventional semiconductor disk device.
Figure 3:
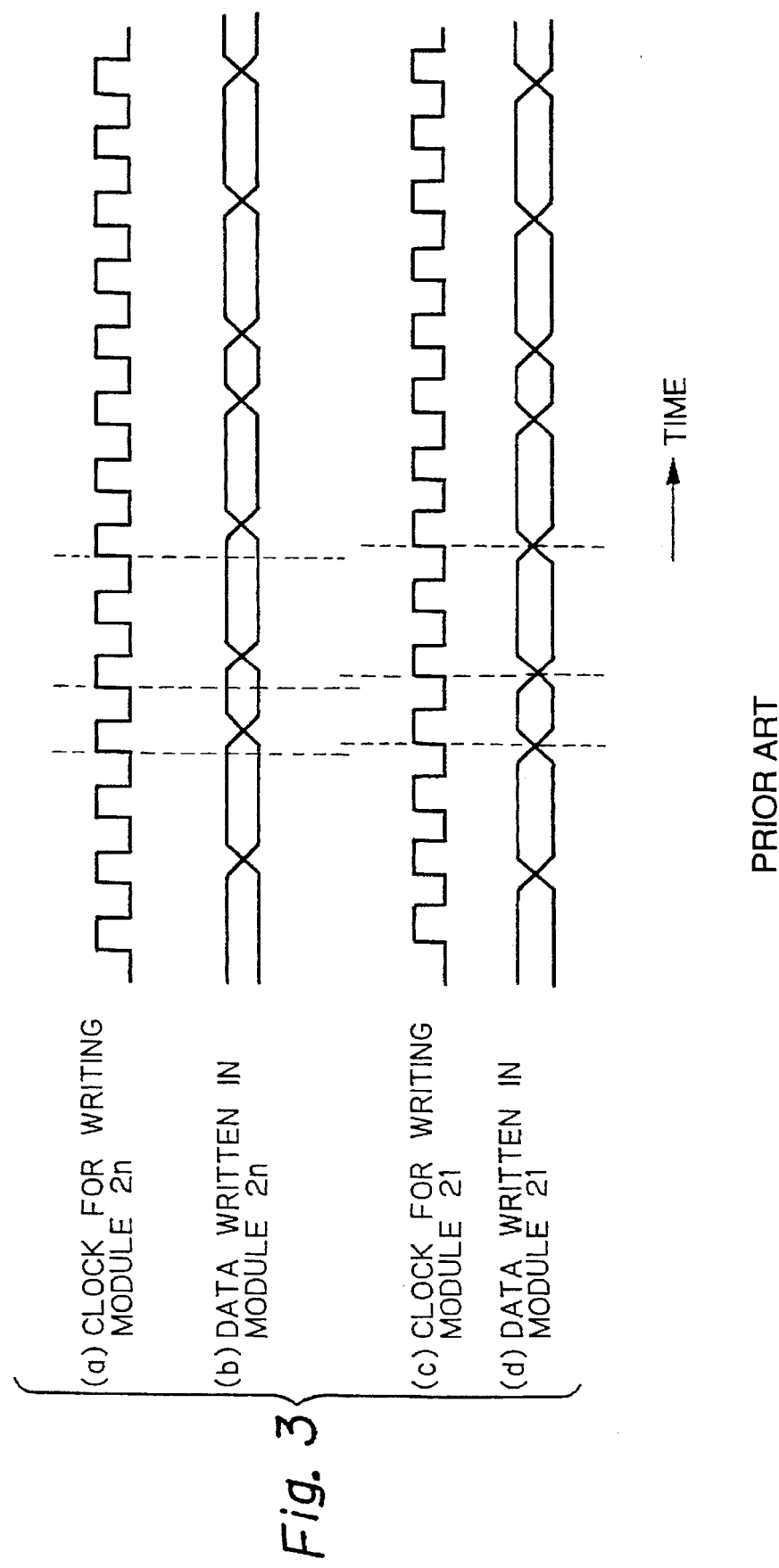
FIG. 3 is a time chart useful for understanding the semiconductor disk device shown in FIG. 2.

The memory controller 6A comprises the memory control circuit 10, which corresponds to the control circuit of the memory controller 6 in the semiconductor disk device 1 shown in FIG. 2, and in addition a plurality of delay devices 11, 12 and 13, a selector 14 and a delay information register 15. In the specific embodiment, three delay devices 11, 12 and 13 are provided by way of example.

The memory control circuit 10 serves to output the serial data for control to the memory module 2i to be accessed in synchronism with the clock signal, convert the transfer data read out from the buffer memory 5 via the host interface 4 into the serial data, and output the data thus converted to the memory module 2i to be accessed in synchronism with the clock signal, in accordance with control information outputted from the microcomputer 3A.

Three delay devices 11-13 are connected with each other in a cascade fashion as shown. This cascade connection is arranged so as to receive the serial data outputted from the memory control circuit 10. Thus, four serial data, which are mutually different in phase by a predetermined unit of delay time, are obtained from the front and back stages of the cascade connection and the middle taps. These data are fed to the selector 14 as a selection input. The selector 14 receives a delay device selection signal from the delay information register 15 and selects the serial data according to the delay device selection signal. The serial data thus selected is sent out to the data line LDAT connected to the memory module group 2.

The unit delay time is set up to such a degree that even the time difference between non-delayed serial data and the most delayed serial data is shorter than, for example, half of the period of the clock signal. The delay devices 11–13 may be implemented as a plurality of inverter devices connected in series, or a plurality of latch circuits which are connected in series and each adapted to latch data in response to a clock signal of higher speed than the clock signal (writing clock signal) to be supplied to the memory module group 2.

The delay information register 15 receives the delay information 3Aa, which was outputted from the microcomputer 3A prior to starting of the data transfer by the memory control circuit 10, and the writing signal as well. Thus, the delay information register 15 holds the delay information in accordance with the writing signal. The delay information thus held is fed to the selector 14 in the form of the delay device selection signal.

It is practical that the memory controller 6A is solely mounted on a single semiconductor chip, or mounted together with the host interface 4 and the buffer memory 5 on a single semiconductor chip. This involves no problem as to the transfer delay not intended in the memory controller 6A, but involves problems as to a deviation of transfer delay on the data line LDAT and the clock signal line LCLK connected to the memory modules 21 . . . , 2n, a variation of the transfer delay, and the like.

The delay information 3Aa involved in the memory modules 21 . . . , 2n, which is stored beforehand in the microcomputer 3A, is determined taking into consideration a deviation of transfer delay on the data line LDAT and the clock signal line LCLK connected to the memory modules 21 . . . , 2n, which lines are formed on a printed circuit board, a variation of the transfer delay, and the like. For example, it is acceptable that the delay information is uniquely determined depending upon where the memory modules 21, . . . , 2n are located, for example, the length of the signal lines of the memory modules 21 . . . , 2n. Alternatively, the optimum delay information is determined through an experiment after the memory modules 21 . . . , 2n are mounted.

Figure 4:
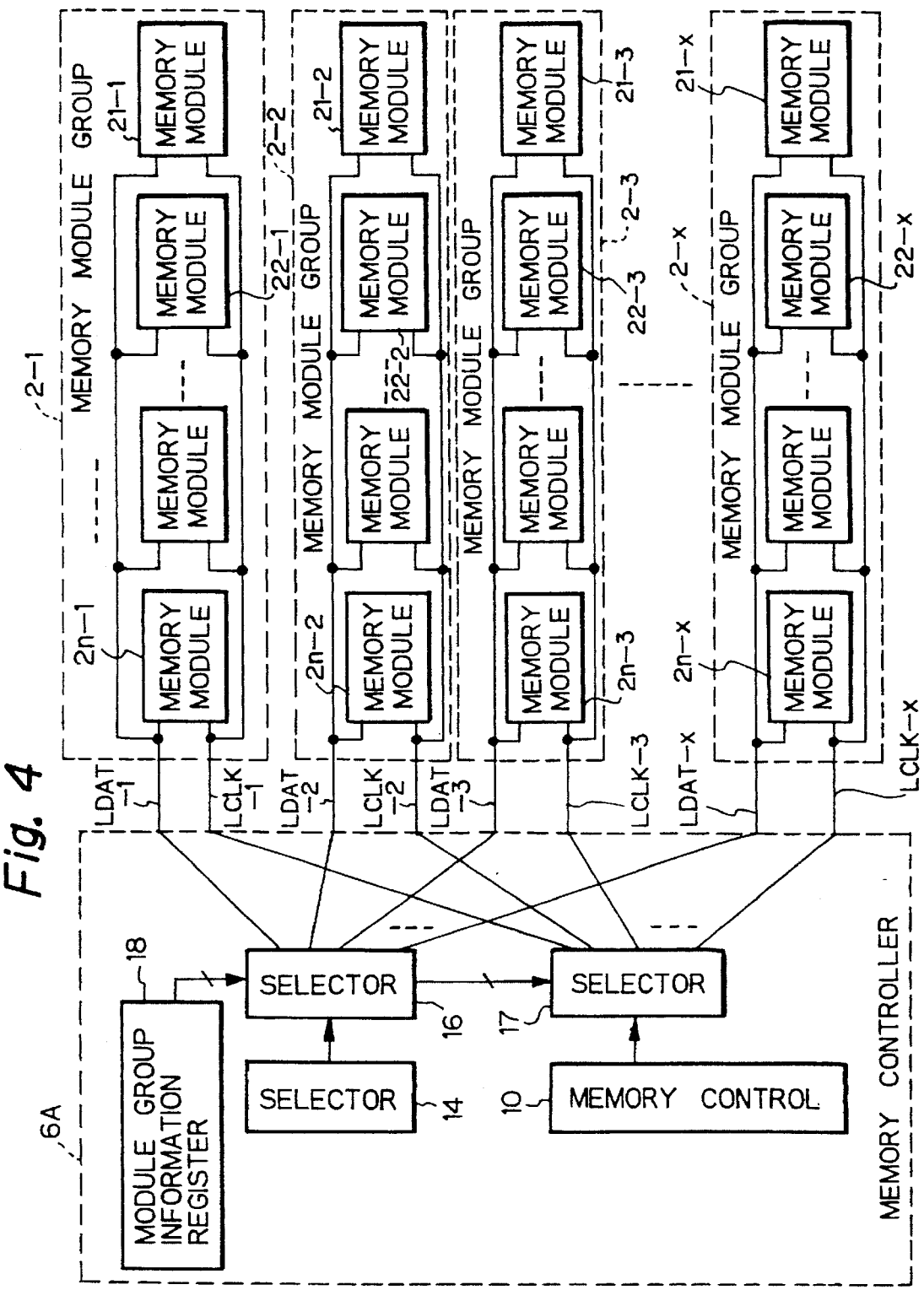
FIG. 4 is a schematic block diagram of a semiconductor disk device wherein a plurality of memory module groups are provided, which is a modification of the embodiment shown in FIG. 1.

In FIG. 1, for the purpose of simplification of the explanation of the structure, there is shown the use of a single memory module group 2. However, actually, a plurality of memory module groups 2 may often be provided. FIG. 4 shows an embodiment in which a plurality of memory module groups 2 are provided, and the memory controller 6A in FIG. 1 is supplemented.

In the memory controller 6A, at the output side of the selector 14 for selecting serial data which are mutually different in delay time, there is provided another selector 16 for selecting memory module groups 2-1 . . . , 2-x, where x is an integer. Also, at the sending out side of the clock signal of the memory control circuit 10, there is provided a further selector 17 for selecting memory module groups 2-1, . . . , 2-x. These selectors 16 and 17 are arranged to receive on a common basis a module group selection signal from a module group information register 18 which serves to hold module group information supplied from the microcomputer 3A, so as to select a data line LDAT-j and a clock signal line LCLK-j to a desired memory module group 2-j, where j is an integer 1 to x.

In the case where a plurality of memory module groups 2-1 . . . , 2-x are provided, a plurality of data lines LDAT-1 to LDAT-x and a plurality of clock signal lines LCLK-1 to LCLK-x may be connected a star connection, respectively.

To effect a writing operation on the semiconductor disk device 1A mentioned above, there is a need to supply from a host computer, not shown, to the semiconductor disk device 1A a command including information such as a header No., a cylinder No., a top sector No., the number of writing sectors and the like, and an additional command for instructing a writing operation. After issuance of these commands, data are transferred after the lapse of a predetermined time corresponding to the seek time, the rotation period and the like.

Upon receipt of the commands through the host interface 4, the microcomputer 3A decodes and converts the commands into control information accessible to a memory module 2i–j, the control information including an indication designating a memory module 2i–j and an address designating a sector in that memory module 2i–j, into which data is to be written, where i is an integer between 1 and n, inclusive, and j is a an integer between 1 and x, inclusive. The control information thus converted includes delay information 3Aa as to the memory module 2i–j and module group information. On the other hand, transmitted data is fed through the host interface 4 to the buffer memory 5.

The microcomputer 3A first feeds delay information 3Aa and the associated writing signal to the delay information register 15 within the memory controller 6A to hold the same therein so as to define the selection state of the selector 14, and on the other hand, feeds module group information and the associated writing signal to the module group information register 18 within the memory controller 6A to hold the same therein so as to define the selection states of the selectors 16 and 17, thereby setting up a transfer pulse to a desired memory module 2i–j. Thereafter, the microcomputer 3A feeds control information to the memory control circuit 10 within the memory controller 6A to start the transfer.

Upon receipt of the control information, the memory control circuit 10 outputs serial data for control, which consists of an address, a control signal for instructing writing and the like, in synchronism with the clock signal. The serial data for control outputted from the memory control circuit 10 is phase-shifted through variable phase shift means comprising the delay stages 11–13 and the selector 14, and then outputted via the selector 16 to a desired data line LDAT-j. On the other hand, the clock signal outputted from the memory control circuit 10 is outputted via the selector 17 to a desired clock signal line LCLK-j. Thus, a desired memory module 2i–j recognizes that a sector of data will be transferred thereto and waits for the transferred data.

Subsequent to sending out the controlling serial data, the memory control circuit 10 is operative to read a sector of data out of the buffer memory 5 and practice a parallel-to-serial conversion to the data thus read out. The data subjected to parallel-to-serial conversion are outputted in synchronism with the clock signal. Also at that time, the serial data for control outputted from the memory control circuit 10 is phase-shifted through variable phase shift means comprising the delay stages 11–13 and the selector 14, and then outputted via the selector 16 to desired data line LDAT-j. On the other hand, the clock signal outputted from the memory control circuit 10 is outputted via the selector 17 to a desired clock signal line LCLK-j. The memory module 2i–j, which recognizes that data will be transferred thereto, receives the transferred serial data in synchronism with the clock signal. Such a transfer on a sector-by-sector basis is repeated by the corresponding number of sectors as instructed by the host computer.

When the memory module destination is altered, while transferring, from the memory module 2i–j to the the memory module 2k–j, k being a positive integer between 1 and n, inclusive, the microcomputer 3A temporarily interrupts the data transfer to feed the delay information 3Aa and the associated writing signal to the delay information register 15 within the memory controller 6A so as to alter the selection state of the selector 14, and thereafter resume the data transfer. Also when the memory module group to be destined is altered, the similar control for adjusting the amount of phase shift of the serial data is performed.

Figure 5:
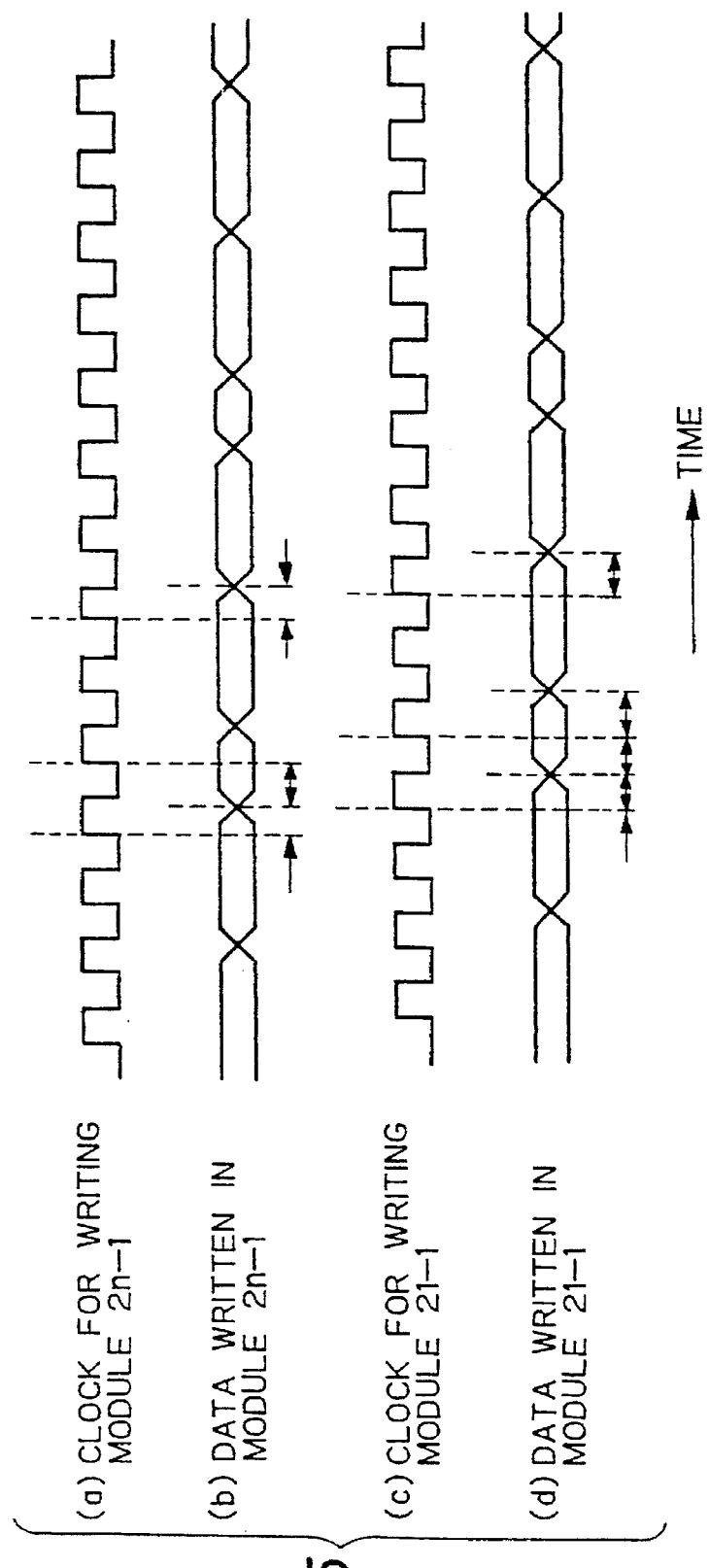
FIG. 5 is a time chart useful for understanding the semiconductor disk device according to the embodiment.

FIG. 5 is a time chart showing an example of timing of writing data from the memory controller 6A into the memory module in the semiconductor disk device according to the first embodiment. With respect to the memory module 2n-1 nearest to the memory controller 6A in the memory module group 2-1 (refer to parts (a) and (b) of FIG. 5) and up to the memory module 21-1 farthest from the memory controller 6A in the memory module group 2-1 (refer to parts (c) and (d) of FIG. 5), the phase of the transfer data is regulated in compliance with the associated memory module. Consequently, even if a deviation in timing were induced during receiving the clock signal and data into the respective memory modules due to the various kinds of causes as described earlier in connection with the background art, such a deviation will be suppressed through the above-mentioned phase regulation. Thus, as seen from FIG. 5, it is possible for the respective memory modules to receive the transferred data in a suitable time period, thereby providing sufficient set-up time and hold time.

As mentioned above, according to the first embodiment, there is stored beforehand in the microcomputer 3A delay information 3Aa according to a difference in transfer timing of the clock signal and the data for each memory module 2i–j at the time of writing data from the memory controller 6A into the memory module 2i–j, and when the data is written, the delay information 3Aa is written from the microcomputer 3A into the delay information register 15 to regulate the phase of the transferred data. Thus, it is possible to provide optimum set-up time and hold time during writing of data into the memory module 2i–j. Therefore, there is no need to adapt the clock period and the like for the worst timing of memory module, thereby enabling a high speed writing of memory data.

As mentioned above, the writing of data into the memory module 2i–j involves a problem regarding the phase relation between data and the clock signal. Since the phase relation is relative, there can be a way in which the phase of the clock signal can be controlled without altering the phase of data. This way may be considered to be a modification of the first embodiment of the present invention. However, the clock signal is utilized throughout the semiconductor disk device, and it is frequently the case that it is not preferable that the phase of the clock operative inside the memory controller 6A be different from that outputted to the exterior. Thus, in view of the above, it is preferable that the phase of data be controlled.

(B) Second embodiment

Figure 6:
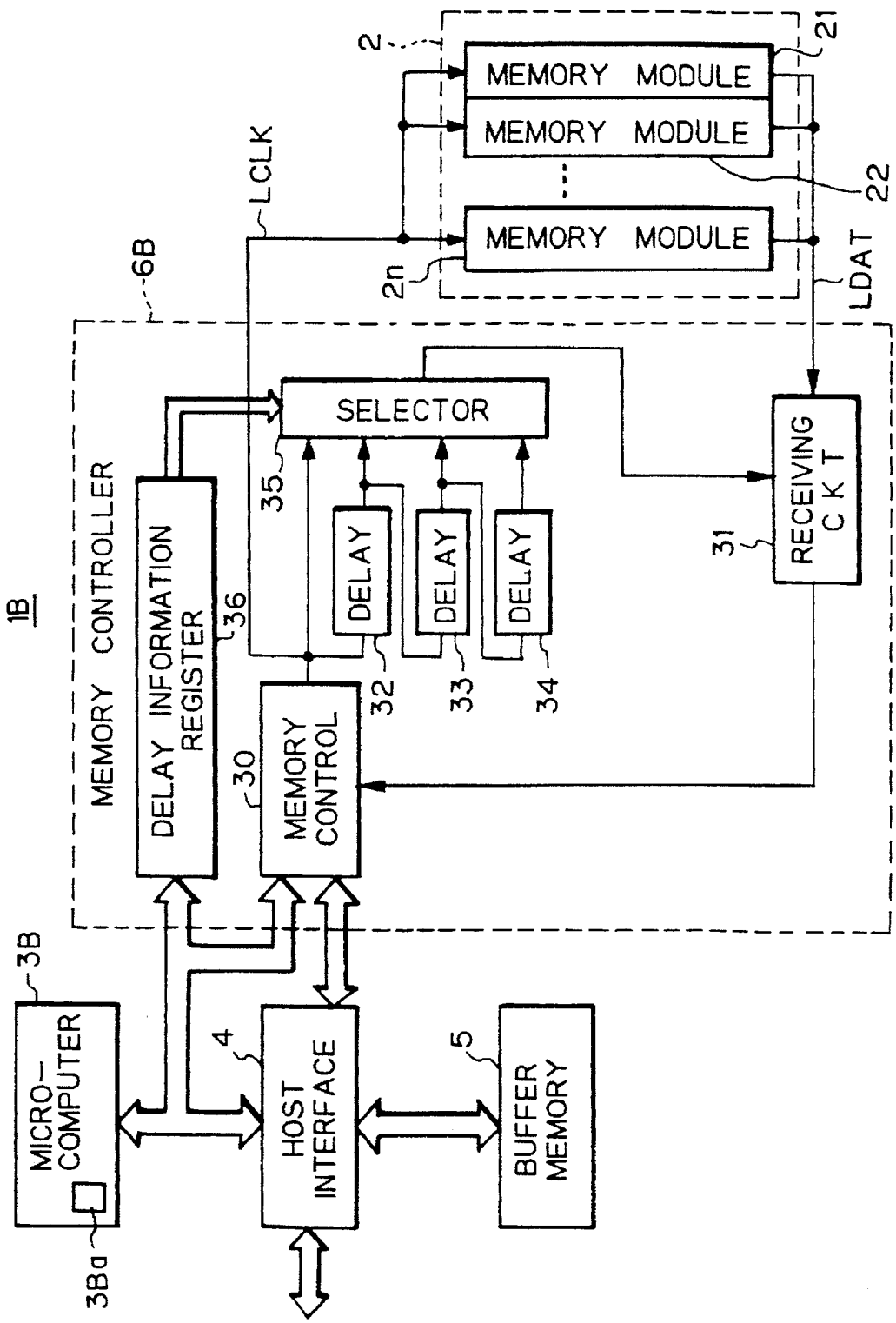
FIG. 6 is a schematic block diagram of a semiconductor disk device according to an alternative embodiment of the present invention.

The second embodiment, in which the present invention is applied to a semiconductor disk device, will be described in conjunction with other figures of the accompanying drawings. An aspect of the semiconductor disk device according to the second embodiment resides in reading out of the memory modules. In order to simplify the explanation of the aspect, FIG. 6 shows the use of a single memory module group. In an application using a plurality of memory module groups, the FIG. 6 embodiment is not directly applicable but may be modified as seen from FIG. 4. In FIG. 6, like elements are denoted by the same reference numerals or marks as those of FIG. 2.

In FIG. 6, the semiconductor disk device 1B according to the second embodiment also comprises a memory module group 2, a microcomputer 3B, a host interface 4, a buffer memory 5 and a memory controller 6B. However, the microcomputer 3B and the memory controller 6B are different from those of the semiconductor disk device 1 shown in FIG. 2.

The microcomputer 3B stores delay information 3Ba for each of the memory modules 21 . . . , 2n in the case where data are transferred to the memory modules 21 . . . , 2n. For example, the delay information 3Ba is stored in the form of a microprogram. When the microcomputer 3B recognizes the memory module 2i out of which data is read, the microcomputer 3B feeds the delay information 3Ba and the associated writing signal to the memory controller 6B, prior to starting of data transfer from the memory module group 2 by a memory control circuit 30 which will be described later.

The memory controller 6B comprises the memory control circuit 30, which corresponds to the control circuit of the memory controller 6 in the semiconductor disk device 1 shown in FIG. 2, and a circuit 31 for receiving read data, which may comprise flip-flops, and in addition a plurality of delay devices 32, 33 and 34, a selector 35 and a delay information register 36. In the specific embodiment, three delay devices 32, 33 and 34 are provided by way of example.

The memory control circuit 30 serves to output the serial control data to the memory module 2i to be accessed in synchronism with the clock signal, convert the transfer data read out from the memory module 2i by the receiving circuit 31 in synchronism with the clock signal, and store the data thus converted in the buffer memory 5 via the host interface 4, in accordance with control information outputted from the microcomputer 3B.

According to the second embodiment of the semiconductor disk device, the clock signal outputted to the memory module 2i to read data out of the memory module 2i and the clock signal to cause the receiving circuit to receive data read out of the memory module 2i are different in phase from each other. Specifically, according to the second embodiment, the phase of the clock signal with which the receiving circuit receives data read out of the memory module 2i varies from memory module to memory module. To implement such a function, there are provided three delay devices 32–34, the selector 35 and the delay information register 36.

Three delay devices 32–34 are connected with each other in a cascade fashion. This cascade connection is arranged so as to receive the clock signal outputted from the memory control circuit 30, which clock signal is also sent out to the clock signal line LCLK. Thus, four clock signals, which are mutually different in phase by a predetermined unit of delay time, are obtained from the front and back stages of the cascade connection stages and the middle taps. These clock signals are fed to the selector 35 as a selection input. The selector 14 receives a delay device selection signal from the delay information register 36 and selects the clock signal according to the delay device selection signal. The clock signal thus selected is sent out to the receiving circuit 31 as a receiving clock signal.

While there is no need for the unit delay time to be the same as that of the first embodiment, the unit delay time is set up to such a degree that even the time difference between the non-delayed clock signal and the most delayed clock signal is shorter than, for example, the half of the period of the clock signal.

The delay information register 36 receives the delay information 3Ba, which was outputted from the microcomputer 3B prior to starting of the data transfer from the memory module 2i by the memory control circuit 30, and the writing signal as well. Thus, the delay information register 36 holds the delay information in accordance with the writing signal. The delay information thus held is fed to the selector 35 as the delay device selection signal.

In order to read data out of the memory module 2i, the clock signal is applied to the memory module 2i. The memory controller 6B receives the data thus read. This involves problems as to a deviation in timing, which will be more severe than that of writing operation.

The delay information 3Ba involved in the respective memory modules 21 . . . , 2n, which is stored beforehand in the microcomputer 3B, is determined taking into consideration a deviation of transfer delay on the data line LDAT and the clock signal line LCLK connected to the memory modules 21 . . . , 2n, which lines are formed on a printed circuit board, a variation of the transfer delay, and the like. For example, the delay information may be determined depending upon where the the memory modules 21 . . . , 2n are located, for example, the length of the signal lines and the like. Alternatively, the optimum delay information is determined through a measurement performed after the memory modules 21 . . . , 2n are mounted.

In FIG. 6, for the purpose of simplification of the explanation of the structure, there is shown the use of a single memory module group 2. However, actually, a plurality of memory module groups 2 may often be provided. While an illustration is omitted, in an application where a plurality of memory module groups are provided, there may be provided a selector or the like to select a clock signal line and a data line to which a desired memory module is coupled (refer to FIG. 4).

To effect a reading operation on the semiconductor disk device 1B mentioned above, there is a need to supply from a host computer side, not illustrated, to the semiconductor disk device 1B a command including information such as a header No., a cylinder No., the top sector No., the number of reading sectors and the like, and an additional command for instructing a readout operation.

Upon receipt of the commands through the host interface 4, the microcomputer 3B decodes and converts the commands into control information accessible to a memory module 2i, the control information including an indication designating a memory module 2i and an address designating a sector in that memory module 2i, from which data is to be read out. The control information thus converted includes delay information 3Ba as to the memory module 2i.

The microcomputer 3B first feeds delay information 3Ba and the associated writing signal to the delay information register 36 within the memory controller 6B to hold the same therein so as to define the selection state of the selector 35, thereby setting up a clock phase to receive data from a desired memory module 2i. Thereafter, the microcomputer 3B feeds control information to the memory control circuit 30 within the memory controller 6B to start the readout transfer.

Upon having received the control information, the memory control circuit 30 outputs serial data for control, which consists of an address, a control signal for instructing writing and the like, in synchronism with the clock signal which is not subjected to a phase control. This operation can be implemented with, for example, the structure of the first embodiment.

The memory control circuit 30 sends out, even after sending out the controlling serial data, the clock signal not subjected to a phase control over the clock signal line LCLK to the memory module group 2. A desired memory module 2i recognizes, on the basis of the controlling serial data, that it should perform a readout operation, and takes a standby state. Thereafter, the memory module 2i sends out data to the data line LDAT in synchronism with the incoming clock signal.

The data read from the desired memory module 2i onto the data line LDAT are received by the receiving circuit 31 in repsonse to the phase-controlled clock signal outputted from the selector 35, and thereafter converted by the memory control circuit 30 into parallel data, in the memory controller 6B. The data thus obtained are stored in the buffer memory 5 through the host interface 4. The readout data stored in the buffer memory 5 are sent out through the host interface 4 to the host computer. When data are read out of another memory module 2n within the memory module group 2, similar processing is also effected.

Figure 7:
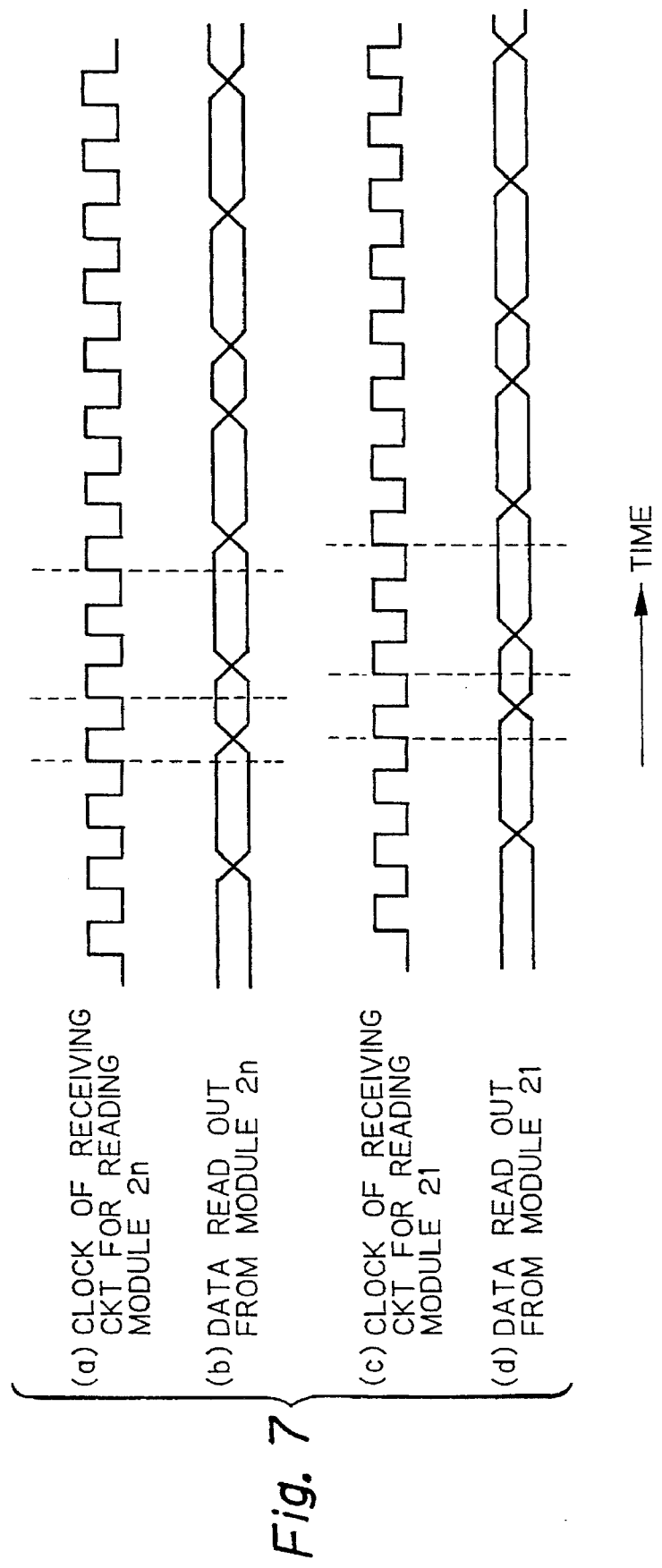
FIG. 7 is a time chart useful for understanding the semiconductor disk device shown in FIG. 6.

FIG. 7 is a time chart showing example timing for reading data from the memory module in the memory controller 6B in the semiconductor disk device according to the second embodiment.

With respect to the memory module 2n nearest to the memory controller 6B in the memory module group 2 (refer to parts (a) and (b) of FIG. 7) and up to the memory module 21 farthest from the memory controller 6B in the memory module group 2 (refer toparts (c) and (d) of FIG. 7), the phase of the clock signal to receive the transfer data is regulated in compliance with the associated memory module. Consequently, even if a deviation in timing for taking data into the receiving circuit 31 were induced due to the various kinds of causes as described in connection with the background art, such a deviation will be suppressed through the above-mentioned phase regulation. Thus, as seen from FIG. 7, it is possible for the memory controller 6B (the receiving circuit 31) to receive the transferred data at a suitable time period, thereby providing sufficient set-up time and hold time.

As mentioned above, according to the second embodiment, there is stored in the microcomputer 3B predetermined delay information 3Ba according to a difference in transfer timing, depending on where each memory module 2i is located, at the time of reading out data from the memory module 2i into the memory controller 6B, and when the data is read out, the delay information 3Ba is written from the microcomputer 3B into the delay information register 36 to regulate the phase of the receiving clock signal. Thus, it is possible to receive the readout data from the memory module at a suitable time period, and also to provide suitable set-up time and hold time even in the case of readout from any memory module. Therefore, there is no need to control the clock signal of the apparatus taking into consideration the worst case timing for a memory module, thereby enabling a high speed readout of memory data.

The second embodiment may be modified such that the phase-controlled clock signal is applied to the memory modules and non-phase-controlled clock signal is applied to the receiving circuit 31. However, in view of a consistency with the situation in the non-phase-controlled clock signal is applied to the memory modules during writing data into the memory module, and also a possibility that a period from the time point when the clock signal is sent out to the time point when data is received is elongated, it is preferable that as in the second embodiment, the non-phase-controlled clock signal is applied to the memory modules and the phase-controlled clock signal is applied to the receiving circuit 31.

In a similar fashion to that of the first embodiment, the readout data may also be controlled in phase and the clock signal from the memory control circuit 30 may be directly applied to the receiving circuit 31.

(C) Third embodiment

The third embodiment, in which the present invention is applied to a semiconductor disk device, will be described in conjunction with still other figures of the accompanying drawings. An aspect of the semiconductor disk device according to the third embodiment resides in writing data into the memory modules. The semiconductor disk device according to the third embodiment is similar in many parts to that according to the first embodiment. Hence, points different from the first embodiment will be mainly described hereinafter and redundant description will be omitted.

Figure 8:
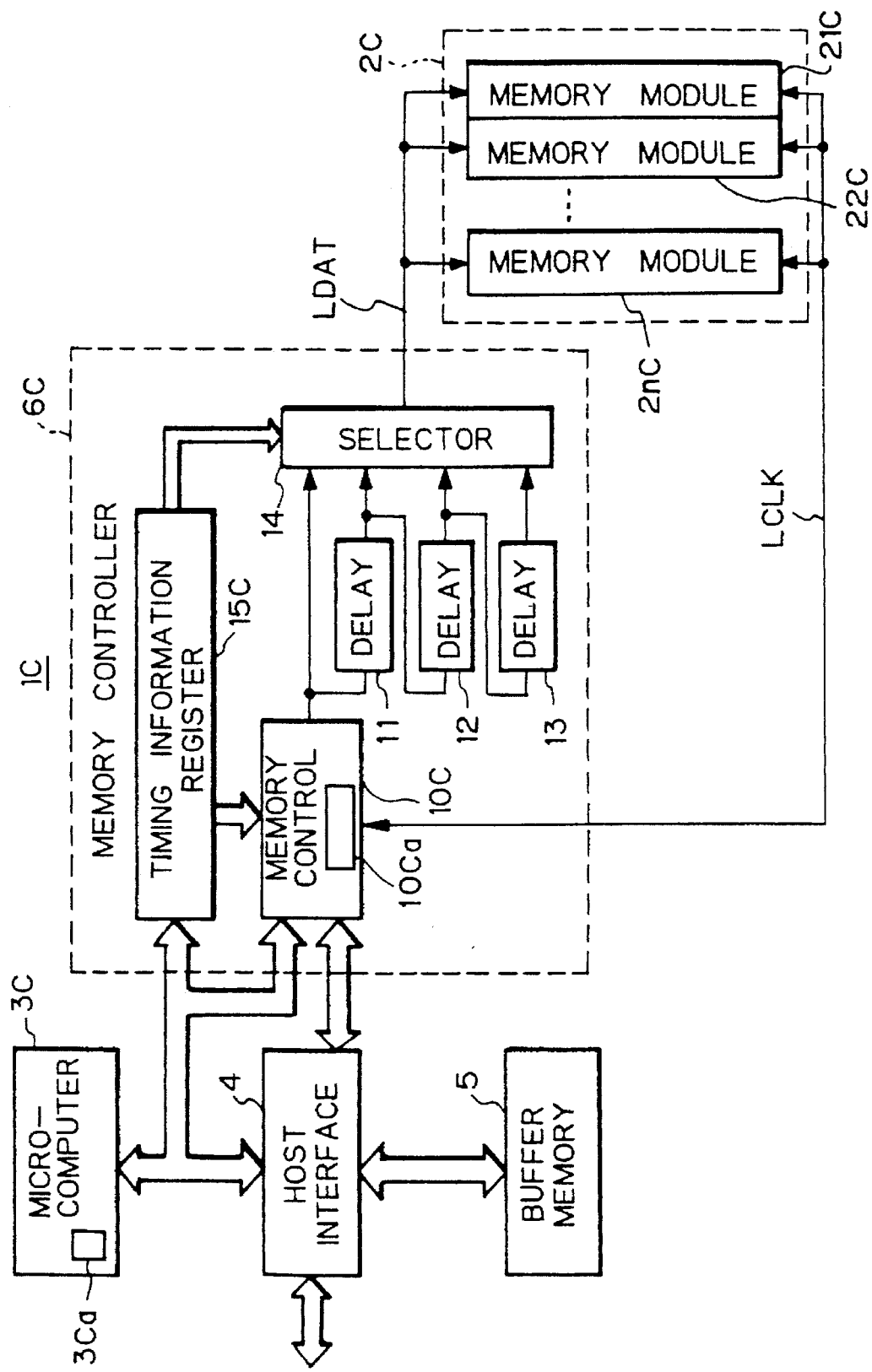
FIG. 8 is a schematic block diagram of a semiconductor disk device according to a further alternative embodiment of the present invention.

FIG. 8 is a schematic block diagram of a semiconductor disk device 1C according to the third embodiment of the present invention. In FIG. 8, the like elements are denoted by the same reference numerals or marks as those of FIG. 1. In FIG. 8, a memory module group 2C in the semiconductor disk device 1C according to the third embodiment has a plurality of memory modules 21C–2nC having different operational speeds. It is assumed that there are provided two operational speeds so that the memory module 2nC nearest to the memory controller 6C is of a higher speed (e.g. 100 ns) and the memory module 21C farthest from the memory controller 6C is of a lower speed (e.g. 250 ns).

For example, in the case where it is desired to prevent the cost of the overall device from being increased and in addition to enable data to be accessed more frequently, at least, to be accessed at higher speed, and/or in the case where a large quantity of memory modules having the same operational speed are not available, it will be useful to adopt a plurality of memory modules having different operational speeds.

Since the high speed memory module is accessible at high speed, it is preferable that the higher-speed memory module is mounted at the side nearer the memory controller 6C.

The microcomputer 3C and the memory controller 6C are different in structure from the first embodiment accordingly as the memory module group 2C has a plurality of memory modules 21C–2nC having different operational speeds.

The microcomputer 3C also stores also timing information 3Ca consisting of delay information for each of the memory modules 21 . . . , 2n for transferring data to the memory modules 21 . . . , 2n, and information (hereinafter referred to as clock width information) as to the clock signal which is used at that time. For example, the timing information 3Ca is stored in the form of a microprogram. When the microcomputer 3C recognizes the memory module 2i into which data is to be written, the microcomputer 3C feeds the timing information 3Ca and the associated writing signal to the memory controller 6C, prior to starting of data transfer to the memory module group 2 by a memory control circuit 10C.

The memory controller 6C has a timing information register 15C instead of the the delay information register 15 in the first embodiment. The timing information register 15C serves to hold therein the timing information 3Ca when the timing information 3C and the associated writing signal are fed from the microcomputer 3C. The timing information register 15C feeds the delay information to a selector 14 in the form of a delay device selection signal and also feeds the clock width information to the memory control circuit 10C.

The memory control circuit 10C incorporates thereinto a clock width control unit 10Ca to adopt a clock signal according to the clock width information fed from the timing information register 15C. The clock width control unit 10Ca may, for example, be of the type in which the dividing ratio of an oscillated signal of an oscillator is varied in accordance with the clock width information so as to generate a desired clock signal, or, alternatively, in which a clock signal for use in a higher-speed memory module is a basic clock signal, which is in turn divided in frequency to produce a clock signal for use in a lower-speed memory module, when adopted.

According to the third embodiment of the semiconductor disk device, the clock signal and its phase-shift quantity as well are selected in accordance with the memory module to be accessed.

The arrangement of the third embodiment is similar to that of the first embodiment, except for the above-mentioned features. Thus the redundant explanation will be omitted. Also, as an application using a plurality of memory modules, it is similar to that of the first embodiment, except for the above-mentioned features. Thus the redundant description will also be omitted.

To effect a writing operation on the semiconductor disk device 1C mentioned above, there is a need to supply from a host computer, not illustrated, to the semiconductor disk device 1C a command including information such as a header No., a cylinder No., the top sector No., the number of writing sectors and the like, and an additional command for instructing a writing operation. After issuance of these commands, data are transferred after the lapse of a predetermined time corresponding to the seek time, the rotation period and the like.

Upon receipt of the commands through the host interface 4, the microcomputer 3C decodes and converts the commands into control information accessible to a memory module 2i, the control information including an indication designating a memory module 2i and an address designating a sector in that memory module 2i, into which data is to be written. The control information thus converted includes the timing information 3Ca, consisting of the delay information and the clock width information, as to the memory module 2i. On the other hand, transmitted data is fed through the host interface 4 to the buffer memory 5.

The microcomputer 3C first feeds the timing information 3Ca and the associated writing signal to the timing information register 15C within the memory controller 6C to hold the same therein so as to define the selection state, or the phase of clock signal, of the selector 14, define a clock signal to be outputted from the memory control circuit 10C (to select the width or duration of the clock signal), and set up a transfer path to a desired memory module 2i. As a result, there is adopted a clock signal suitable for the desired memory module 2i. Thereafter, the microcomputer 3C feeds control information to the memory control circuit 10C within the memory controller 6C to start the transfer of data. The operation during the transfer is similar to that of the first embodiment, so that a redundant description will be omitted.

The above-mentioned transfer operation is performed in a similar fashion independently of the operational speed of the memory module to be destined, but utilizes different clock width information and delay information.

Figure 9:
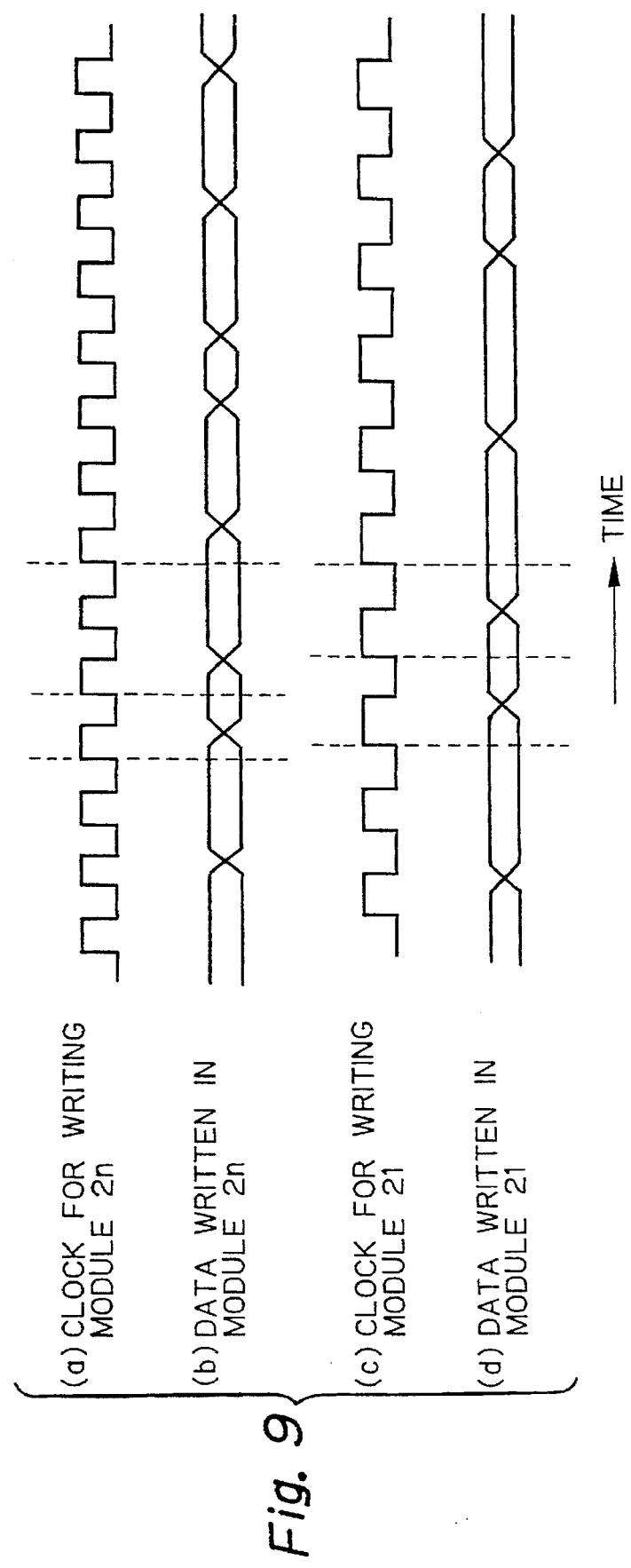
FIG. 9 is a time chart useful for understanding the semiconductor disk device shown in FIG. 8.

FIG. 9 is a time chart showing an example of timing for writing data from the memory controller 6C into the memory module in the semiconductor disk device according to the third embodiment. With respect to the memory module 2n nearest to the memory controller 6C in the memory module group 2 (refer to parts (a) and (b) of FIG. 9), while a clock signal having a clock width or period according to the higher operational speed is applied thereto, the phase of the transfer data synchronized with the clock signal is regulated in compliance with the associated memory module. Consequently, it is possible to receive the transferred data in a suitable time period, thereby providing sufficient set-up time and hold time. On the other hand, with respect to the memory module 21 farthest from the memory controller 6C in the memory module group 2 (refer to parts (c) and (d) of FIG. 9), a clock signal having a clock width or period according to the lower operational speed is applied thereto. Thus, in this respect, it is possible to receive the transferred data in a suitable time period, thereby providing sufficient set-up time and hold time. Further, the phase of the transfer data synchronized with the clock signal is regulated in compliance with the associated memory module. Consequently, also in this respect, it is possible to receive the transferred data in a suitable time period, thereby providing sufficient set-up time and hold time.

As described above, according to the third embodiment, there are stored beforehand in the microcomputer 3C clock width information corresponding to the respective memory modules and delay information for the memory data signal with respect to to the writing clock. When the data is written, information 3Ca including those kinds of information is written from the microcomputer 3C into the register 15C so as to select the clock width, or the kind of clock signal, and the quantity of phase shift of the clock signal. Thus, even if the semiconductor disk device 1C includes memory modules which are different in operational speed performance, it is possible to provide an adequate clock width, set-up time and hold time even when writing data into any memory module 2i.

The third embodiment thus enables memory modules which are different in operational speed performance to be incorporated in the same semiconductor disk device 1C, and data which is to be written more frequently to be stored in a higher-speed memory. Thus, more efficient data writing and also higher speed operation are accomplished in the overall system.

The semiconductor disk device may be arranged in such a manner that the memory modules in each memory module group are provided with the same operational speed as each other, but the memory modules vary in operational speed between the different memory module groups. This is a modification of the third embodiment of the present invention. However, providing higher-speed memory modules in a location farther from the memory controller 6C will involve missing the higher speed performance of the memory modules. Hence, it is preferable, as in the third embodiment, to mount the higher-speed memory modules at a place nearer the memory controller 6C.

Further, the semiconductor disk device may be arranged in such a manner that the delay devices 11–13 and the selector 14 are omitted, and only the clock width is varied in accordance with a desired memory module. This is another modification of the third embodiment of the present invention.

(D) Fourth embodiment

The fourth embodiment, in which the present invention is applied to a semiconductor disk device, will be described in conjunction with the remaining figures of the accompanying drawings. An aspect of the semiconductor disk device according to the fourth embodiment resides, similar to that of the second embodiment, in reading out data from the memory modules. The semiconductor disk device according to the fourth embodiment is similar in many aspects to that according to the second embodiment. Hence, points different from the second embodiment will be mainly described hereinafter and redundant description will be omitted.

FIG. 10 is a schematic block diagram of a semiconductor disk device 1D according to the fourth embodiment of the present invention. In FIG. 10, like elements are denoted by the same reference numerals or marks as those of FIG. 6.

To effect a readout operation on the semiconductor disk device 1D mentioned above, there is a need to supply from a host computer, not shown, to the semiconductor disk device 1D a command including information such as a header No., a cylinder No., the top sector No., the number of writing sectors and the like, and an additional command for instructing a readout operation.

Upon receipt of the commands through the host interface 4, the microcomputer 3D decodes and converts the commands into control information accessible to a memory module 2iD, the control information including an indication designating a memory module 2iD and an address designating a sector in that memory module 2iD, from which data is to be read out. The control information thus converted includes timing information 3Da consisting of delay information and clock width information with respect to the memory module 2iD.

The microcomputer 3D first feeds timing information 3Da and the associated writing signal to the timing information register 36D within the memory controller 6D to store the same therein so as to define the selection state (phase of the clock signal) of the selector 35, define a clock signal to be outputted from the memory control circuit 10D (to select the clock width) with the use of clock width control unit 30Da, and set up a path of the clock signal to a desired memory module 2iD. As a result, there is adopted a clock signal suitable for the desired memory module 2i. Thereafter, the microcomputer 3D feeds control information to the memory control circuit 30D within the memory controller 6D to start the transfer.

Upon receipt of the control information, the memory control circuit 30D outputs serial data for control, which consists of an address, a control signal for instructing readout and the like, in synchronism with the clock signal associated with the memory module 2iD which is not subjected to a phase control. This operation can be implemented with, for example, the functions of the third embodiment.

The memory control circuit 30D sends out, even after having sent out the controlling serial data, the clock signal associated with the memory module 2iD, which is not subjected to a phase control, over the clock signal line LCLK to the memory module group 2D. A desired memory module 2iD recognizes on the basis of the controlling serial data that the memory module 2iD should perform a readout operation, and takes a standby state. Thereafter, the memory module 2iD sends out data to the data line LDAT in synchronism with the incoming clock signal.

The data read out from the desired memory module 2iD onto the data line LDAT are received by the receiving circuit 31 in response to the phase-controlled clock signal outputted from the selector 35, and thereafter converted by the memory control circuit 30 into parallel data, in the memory controller 6D. The data thus obtained are stored in the buffer memory 5 through the host interface 4. The readout data stored in the buffer memory 5 are sent out through the host interface 4 to the host computer.

Also when data are read out of another memory module 2nD within the memory module group 2D, similar processing is effected. In this case, the timing information 3Da consisting of the delay information and the clock width information is adopted in compliance with the memory module 2nD.

FIG. 11 is a time chart showing an example of timing for writing data from the memory controller 6D into the memory module in the semiconductor disk device according to the fourth embodiment.

With respect to the memory module 2nD nearest to the memory controller 6D in the memory module group 2D, while a clock signal having a clock width, or period, according to the higher operational speed is applied thereto, the phase of the clock signal for receiving the transferred data from the memory module 2nd is regulated. Consequently, even if a deviation in timing to receive data into the receiving circuit 31 were induced due to the various kinds of causes as described in connection with the background art, such a deviation will be suppressed through the above-mentioned phase regulation, as seen from parts (a) and (b) of FIG. 11. Thus, it is possible for the memory controller 6D or the receiving circuit 31 to receive the transferred data in a suitable time period, thereby providing sufficient set-up time and hold time.

On the other hand, with respect to the memory module 21D farthest from the memory controller 6D in the memory module group 2, a clock signal having a clock width or period according to the lower operational speed is applied thereto. Thus, in this respect, the memory controller 6D or receiving circuit 31 can receive the transferred data in a suitable time period, thereby providing sufficient set-up time and hold time. Further, a phase of the clock signal to receive the transfer data from the memory module 21D is regulated. Consequently, even if a deviation in timing to take data into the receiving circuit 31 were induced due to the various kinds of causes as described in connection with the background art, such a deviation will be suppressed through the above-mentioned phase regulation, as seen from parts (c) and (d) of FIG. 11. Thus, also in this respect, it is possible for the memory controller 6D or the receiving circuit 31 to receive the transferred data in a suitable time period, thereby providing sufficient set-up time and hold time.

As mentioned above, according to the fourth embodiment, there are stored beforehand in the microcomputer 3D readout clock width information to the respective memory modules and delay information of receiving clock signal to the readout clock, and when the data is read out, information 3Da including those kinds of information is written from the microcomputer 3D into the register 36D so as to select the clock width, or the kind of clock signal, and the quantity of phase shift of the clock signal. Thus, even if the semiconductor disk device 1D includes memory modules which are different in operational speed performance, it is possible to provide an adequate clock width, set-up time and hold time even during the read out of any memory module 2iD.

In this manner, according to the fourth embodiment, the same semiconductor disk device 1D may include memory modules which are different in operational speed performance, and data to be read out more frequently may be stored in a higher speed memory. Thus, more efficient data writing and also higher speed operation are accomplished in the overall system.

With respect to the fourth embodiment also, it is possible to include modifications similar to those of the third embodiment.

(E) Other embodiments

While the above-mentioned embodiments are intended to be used with memory modules having the flash type of memory, other kinds of memory are applicable. It is noted that, for example, in an application in which data writing is accomplished by means of an address line and a data line which are separately provided, there will be needed additionally means for shifting the phase of the address data.

Further, according to the above-described embodiments, information for timing control, such as delay information and timing information, is stored beforehand in the microcomputer. However, the system may be designed so as to store such information in the memory controller from the beginning.

It is noted that the present invention is not restricted in application to a semiconductor disk device, but is widely applicable to a semiconductor memory having a portion in which a plurality of memory modules are connected to a common signal line. For example, the present invention is also applicable to an apparatus in which memory module groups are directly accessed by the microcomputer, a CPU or the like.

While the present invention has been described with reference to the particular illustrative embodiments, it is not to be restricted by those embodiments. It is to be appreciated that may be modified the embodiments without departing from the scope and spirit of the present invention as set forth in the appended claims.

What is claimed is:

1. A semiconductor memory comprising:

a plurality of semiconductor memory modules;

a common clock signal line;

at least one other common signal line; and an accessing circuit, connected through said common clock signal line and said at least one other common signal line to said plurality of semiconductor memory modules, for accessing said plurality of semiconductor memory modules, said accessing circuit comprising:

a timing information storage unit for storing predetermined access timing information associated with each of said semiconductor memory modules; and a timing varying unit for varying a data receiving timing for an accessed one of said plurality of semiconductor memory modules, according to the access timing information stored in said timing information storage unit.

2. A semiconductor memory according to claim 1, wherein said accessed one of said plurality of semiconductor memory modules includes means for receiving data and a control signal, and said timing varying unit phase-shifts the data and control signal received by said accessed one of said plurality of semiconductor memory modules, according to the access timing information stored in said timing information storage unit.

3. A semiconductor memory according to claim 1, wherein said timing varying unit phase-shifts a clock signal on said clock signal line according to the access timing information stored in said timing information storage unit.

4. A semiconductor memory comprising:

a plurality of semiconductor memory modules having respective different operational speeds;

a common clock signal line;

at least one other common signal line; and an accessing circuit, connected through said common clock signal line and said at least one other common signal line to said plurality of semiconductor memory modules, for accessing said plurality of semiconductor memory modules, said accessing circuit comprising:

a timing information storage unit for storing predetermined access timing information associated with each of said semiconductor memory modules; and a clock width varying unit for varying a clock width of a clock signal applied on said common clock signal line to an accessed one of said plurality of semiconductor memory modules, according to the access timing information stored in said timing information storage unit.

5. A semiconductor memory comprising:

a plurality of semiconductor memory modules having respective different operational speeds;

a common clock signal line;

at least one other common signal line; and an accessing circuit, connected through said common clock signal line and said at least one other common signal line to said plurality of semiconductor memory modules, for accessing said plurality of semiconductor memory modules, said accessing circuit comprising:

a timing information storage unit for storing predetermined access timing information associated with each of said semiconductor memory modules;

a timing varying unit for varying a data receiving timing for an accessed one of said plurality of semiconductor memory modules, according to the access timing information stored in said timing information storage unit; and a clock width varying unit for varying a clock width of a clock signal applied on said common clock signal line to the accessed one of said plurality of semiconductor memory modules, according to the access timing information stored in said timing information storage unit.

6. A semiconductor memory according to claim 5, wherein said accessed one of said plurality of semiconductor memory modules includes means for receiving data and a control signal, and said timing varying unit phase-shifts the data and control signal received by said accessed one of said plurality of semiconductor memory modules, according to the access timing information stored in said timing information storage unit.

7. A semiconductor memory according to claim 5, wherein said timing varying unit phase-shifts a clock signal on said clock signal line according to the access timing information stored in said timing information storage unit.

8. A semiconductor memory comprising:

a first memory module for access by a first clock signal;

a second memory module for access by a second clock signal having a clock width wider than that of the first clock signal, said second memory module having an operational speed slower than an operational speed of said first memory module; and an accessing circuit for providing said first memory module with data and the first clock signal, and said second memory module with data and the second clock signal, said accessing circuit comprising a clock width varying unit for generating the first and second clock signals from a common clock signal input.

9. A semiconductor memory according to claim 8, wherein said first and second memory modules and said accessing circuit are all connected through a common clock signal line and at least another common signal line.

* * * * *

UNITED STATES PATENT AND TRADEMARK OFFICE
CERTIFICATE OF CORRECTION

PATENT NO. : 5,646,904
DATED : July 8, 1997
INVENTOR(S) : Yashuhiro Ohno, et. al.

It is certified that error appears in the above-indentified patent and that said Letters Patent is hereby corrected as shown below:

Title page, item [54] and col. 1, line 1, delete "SEMICODUCTOR" and insert --SEMICONDUCTOR--.

Signed and Sealed this

Twenty-third Day of September, 1997

*Attest:*

BRUCE LEHMAN

*Attesting Officer*    *Commissioner of Patents and Trademarks*